Sept. 10, 1929.  W. GNEHM  1,727,594
AUTOMATIC GEAR SHIFT
Filed April 24, 1928   2 Sheets-Sheet 1

INVENTOR.
WALTER GNEHM.
By Alan Franklin
ATTORNEY.

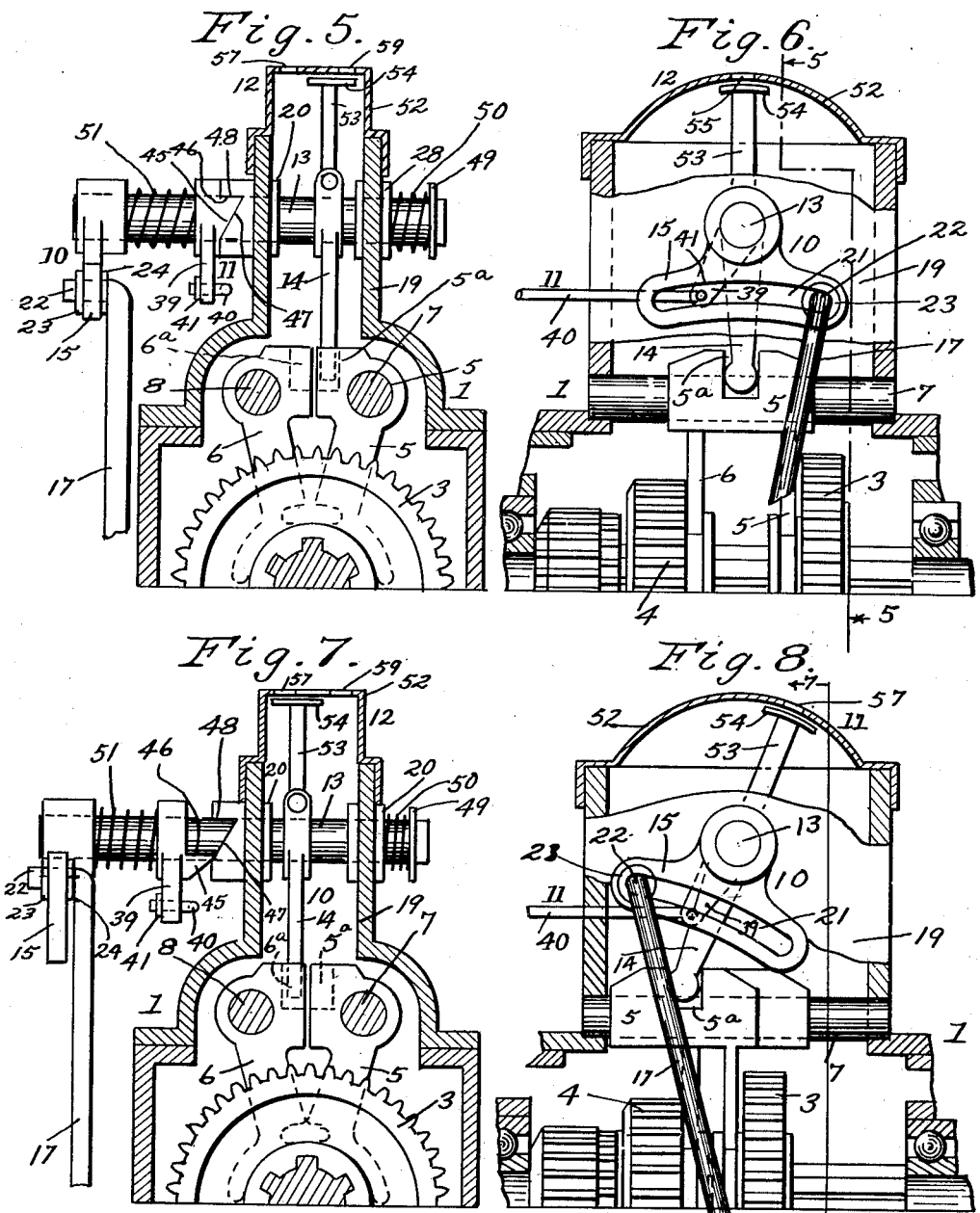

Patented Sept. 10, 1929.

1,727,594

UNITED STATES PATENT OFFICE.

WALTER GNEHM, OF LOS ANGELES, CALIFORNIA, ASSIGNOR OF ONE-HALF TO EUGENE H. GRAFTON, OF LOS ANGELES, CALIFORNIA.

AUTOMATIC GEAR SHIFT.

Application filed April 24, 1928. Serial No. 272,460.

This invention relates to gear shift mechanism and more particularly to an automatic gear shift.

One of the objects of the invention is to provide an automatic gear shift by means of which the control of an automobile is greatly simplified.

Another object is to provide an improved gear shift for automobiles which eliminates the conventional gear shift lever.

Another object is to provide an improved gear shift which will take up less room than the standard gear shifts, thus clearing the floor boards of the automobile and providing more room in the front of the car.

Another object is to provide an automatic gear shift which operates to shift the gears only when the clutch is disengaged, thus preventing stripping of the gears.

Another object is to provide an automatic gear shift for automobiles which will be positive and silent in operation.

A further object is to provide an improved gear shift which will save wear of the gears.

Other objects and advantages will appear hereinafter.

The invention is illustrated in the annexed drawings which form a part of this specification and in which Fig. 1 is a side elevation of my automatic gear shift shown applied to an automobile gear transmission and clutch.

Fig. 5 is a transverse vertical section of Fig. 6 taken on line 5—5.

Fig. 6 is a fragmentary side view of my invention on an enlarged scale applied to an automobile transmission, showing the parts in neutral position.

Fig. 7 is a transverse vertical section of Fig. 8 taken on line 7—7.

Fig. 8 is a fragmentary side view of my invention on an enlarged scale applied to an automobile transmission, showing the parts in low speed position.

Corresponding parts are designated by the same reference characters in all the figures.

Figure 1:
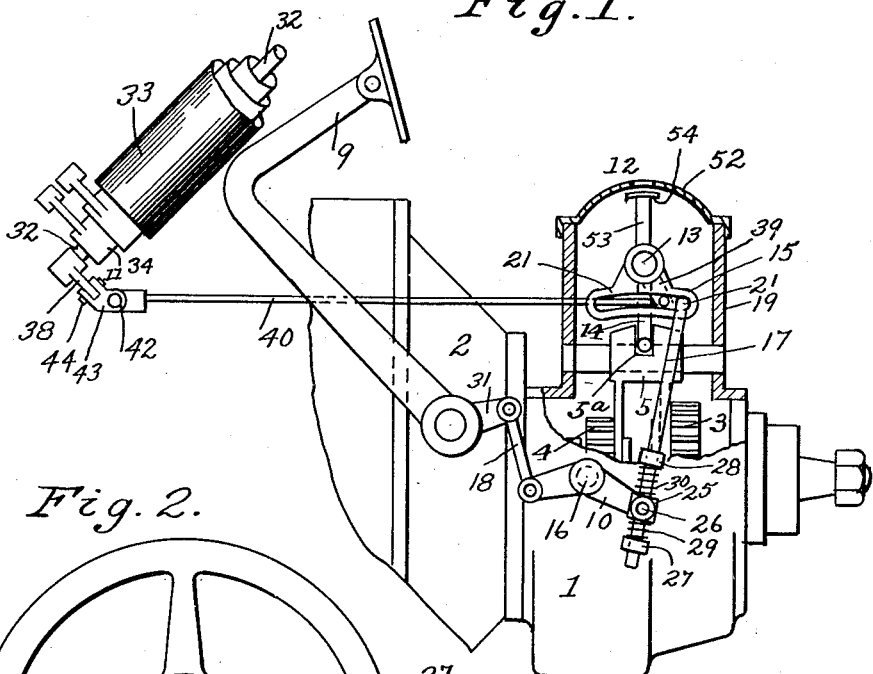
Figure 2:
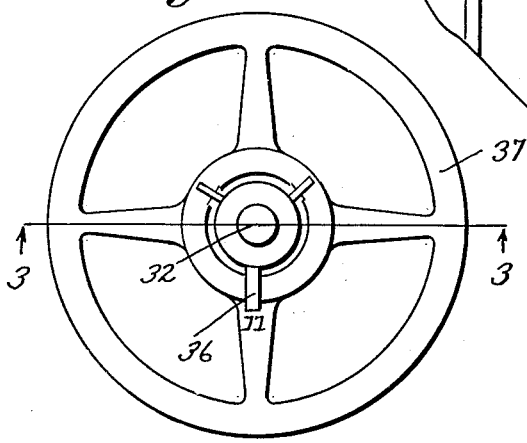
Fig. 2 is a plan view of the steering wheel of an automobile showing the setting arm of my automatic gear shift mounted on the wheel.
Figure 3:
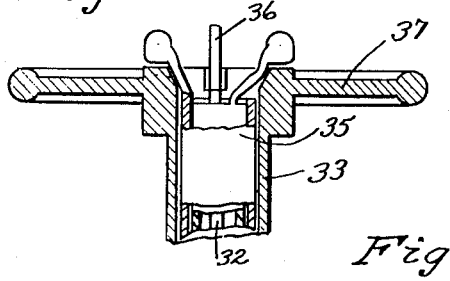
Fig. 3 is a transverse vertical section of Fig. 2 taken on line 3—3.

In the drawings I have illustrated an automobile transmission, designated 1, and an automobile clutch designated 2, which may be standard, with the exception that the gear shift lever of the standard transmission is eliminated in the application of my invention to the transmission. The transmission 1 includes the usual low-and-reverse gear 3, the intermediate-and-high gear 4 and shifting forks 5 and 6 for said gears respectively, which forks in the application of my invention are slidably mounted on shifting fork shafts 7 and 8. The clutch 2 includes the usual clutch operating pedal 9 which, in the application of my invention operates to shift the transmission gears, as will be more fully described hereinafter.

My invention includes generally shift actuating means 10, shift setting means 11, and shift indicating means 12.

The shift actuating means 10 includes a shifter shaft 13, a shift arm 14 for engaging the usual notches 5ª and 6ª in the shifter forks 5 and 6 respectively, a rock link 15, bell crank lever 16, connecting rod 17, and connecting link 18. The shifter shaft 13 extends transversely through the upper member 19 of the transmission casing and is slidably journaled in bearings 20 in said upper casing member. The rock link 15 is secured on one end of the shifter shaft 13 and is provided with an arcuate slot 21 through which the upper bent end 22 of connecting rod 17 extends, there being collars 23 and 24 secured on said bent end at opposite sides of the link 15 to maintain said end of the rod in sliding engagement with the link. The lower end of the rod 17 extends slidably through a block bearing 25 which is pivotally mounted at 26 on one arm of the bell crank lever 16. Collars 27 and 28 are secured on the connecting rod 17 below and above the block bearing 25 respectively. A spring 29 surrounds the rod 17 and bears at its ends against the block bearing 25 and the collar 27. A spring 30 surrounds the rod 17, bearing at its ends against the block bearing 25 and the collar 28. The arc of the rock link slot 21 is described from the pivot connection 26 of the connecting rod 17. The other arm of the bell crank lever 16 is connected to the lower end of connecting rod 18 while the upper end of said connecting rod is connected to a short arm 31 on the clutch pedal 9.

The shift setting means 11 includes a shaft 32 extending concentrically through the automobile steering post 33 and journaled in bearings 34 and 35 therein, a shift setting arm 36 secured to the upper end of the shaft 32 upon the automobile steering wheel 37, an arm 38 secured on the lower end of the shaft 32 below the lower end of the steering post 33, an arm 39 turnably mounted on the shifter shaft 13, a connecting rod 40 connected at one end at 41 to the arm 39, and pivotally connected at its other at 42 to a knuckle 43 which in turn is pivotally connected at 44 to the end of the arm 38. On the arm 39 is formed a tooth cam 45 and a shoulder 46 at the end of said cam, while a notch cam 47 is formed in the outer end of one of the bearings 20 to receive the tooth cam 45, said bearing being formed with a shoulder 48 at the lower end of said notch cam against which shoulder the tooth cam shoulder normally engages to limit the turning movement of the cam 45 counterclockwise. On the end of the shifter shaft 13 opposite the end on which the rock link 15 is secured, there is secured a collar 49 and a spring 50 is coiled around the shifter shaft, bearing at its ends against said collar and the adjacent bearing 20 respectively. A spring 51 is coiled around the shifter shaft 13, bearing at its ends against the arm 39 and the rock link 15 respectively.

The indicating means 12 includes a cover 52 fitted on the top of the upper transmission casing member 19, an arm 53 secured on the shifter shaft 13 and extending upwardly therefrom, and an indicator plate 54 secured on the upper end of said arm immediately under the cover 52. The cover 52 is provided with five openings 55, 56, 57, 58 and 59. On the indicator plate are five letters namely, N, R, L, S and H, the letter N being located in the center of the plate and the remaining letters being located in the corners respectively of said plate.

Figure 4:
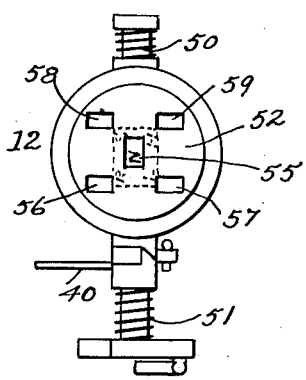
Fig. 4 is a fragmentary plan view of my automatic gear shift, showing particularly my gear shift indicator.
Figure 9:
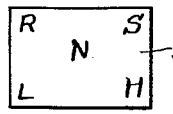
Fig. 9 is a plan view of the indicating plate of the indicator.

The operation of my invention is as follows:

In neutral position the parts are in the positions shown in Figs. 1 to 4 inclusive and Fig. 6, while the cam tooth 45 rests half way out of cam notch 47 and the shift arm 14 rests between the shifting forks 5 and 6, partly in notch 5ª and partly in notch 6ª, whereby the shifting forks are locked against shifting movement. It will be noted that the neutral position above described is indicated by the letter N on indicator plate 54, appearing in the opening 55. (Fig. 4.)

When it is desired to shift the gears into low or reverse, the arm 36 is swung to the left, which through shaft 32, arm 38, knuckle 43, and rod 40 swings the arm 39 until the arm is forced to the left by the engagement of cam tooth 45 with cam notch 47, whereupon the spring 51 is compressed and the shifter shaft 13, shift arm 14 and indicator arm 53 are forced to the left against the tension of spring 50 until the lower end of said arm rests within the notch 6ª of shifter fork 6 (Fig. 7). The driver of the car upon depressing the clutch pedal 9 releases the clutch and swings the rock-link 15, shaft 13, shift arm 14 and indicator arm 53 clockwise (Fig. 8), through the medium of pedal arm 31, connecting rod 18, bell crank 16, and connecting rod 17, whereupon the shift arm 14, engaging the notch 6ª, shifts the shifter fork 6 and low and reverse gear 3 to the left until said gear meshes with the low speed gear of the transmission (not shown) in the usual manner. This position of the parts is indicated by the letter L appearing through opening 57. The clutch pedal 9 upon being released by the driver swings back into its normal position where the clutch 2 is engaged and the automobile starts off in low and during the return of the pedal the upper end 22 of connecting rod 17 slides upwardly in the rock link slot 21 to the left end of said slot (Fig. 8). Upon again depressing the pedal 9 and releasing the clutch the rock link 15, shifter shaft 13, shift arm 14 and indicator arm 53 are swung counterclockwise through the medium of the connecting rod 17, bell crank 16, connecting rod 18 and pedal arm 31, whereupon the low and reverse gear 3 is shifted by shift arm 14 and shifting fork 6 into mesh with the transmission reverse idler gear (not shown) to drive the automobile backwards. Upon releasing the pedal the rod 17 slides to the right-end of the link slot 21. The reverse position of the transmission is indicated by the letter R appearing through opening 56.

When it is desired to shift the gears into second or high, the pedal 9 is again depressed and the gears are again first shifted into low as above described; the arm 36 is then swung to the right, whereupon the arm 39 is swung counter-clockwise through the medium of arm 38, knuckle 43, and rod 40, and the arm 39 is forced by spring 51 to the right, the cam tooth 45 entering the cam notch 47, while the spring 50 forces the shifter shaft 13, indicator arm 53 and shift arm 14 to the right until the lower end of said arm enters the notch 5ᵃ of shifting fork 5 (Fig. 5). The clutch pedal 9 is then depressed by the driver of the car which, through the medium of pedal arm 31, connecting rod 18, bell crank 16, connecting rod 17, swings the rock link 15, shifter shaft 13, indicator arm 53, and shift arm 14 counter-clockwise, whereupon the shift arm, engaging the notch 5ᵃ, moves the shifting fork 5 and the intermediate and high gear 4, to the left, until said gear meshes with the second speed countershaft gear of the transmission (not shown). Upon releasing the pedal the upper end of rod 17 travels to the right end of link slot 21. The second speed position of the gears is now indicated by the letter S appearing through the opening 58. Upon again depressing the pedal 9, the rock link 15, shifter shaft 13, shift arm 14, and indicator arm 53 are swung clockwise, through the medium of connecting rod 17, bell crank 16, connecting rod 18 and pedal arm 31, whereupon the intermediate and high gear 4 is shifted by shift arm 14 and shifting fork 5 into mesh with the transmission main shaft gear and the transmission gears are then in high. This position of the gears is indicated by the appearance of the letter H through opening 59.

The springs 29 and 30 are adapted to yield upon depressing the clutch pedal 9 when the setting means 11 is operated and the gears are in such position that the notches 5ᵃ and 6ᵃ are out of registration and said springs are adapted to expand and assume their normal position to move the rod 17 to shift the gears when the pedal is released and the notches 5ᵃ and 6ᵃ come into registration and the shift arm 14 shifts from one notch into the other for shifting the gears.

In this specification and the annexed drawing I have disclosed my invention in the form which I consider the best, but I do not limit my invention to such form, because it may be embodied in other forms, and it is to be understood that in and by the claims of this specification I intend to cover my invention in whatever form it may be embodied.

Having described my invention, I claim:

1. In combination with the transmission gears and the clutch of a motor vehicle, a slidable shifter shaft, a shift arm secured on said shaft for engaging the notches in the gear shifting forks, a slotted rock link, a connecting rod having one end slidably fitted in the slot of said slotted rock link, a bell crank having one arm connected to the other end of said connecting rod, means connecting the other arm of said bell crank to the clutch pedal, and shift setting means for shifting and setting said shifter shaft for causing said shift arm to engage both notches in the gear shifting forks for neutral position, or to engage the notch in one fork for shifting the gears into low or reverse, or to engage the notch in the other shifting fork for shifting the gears into second or high.

2. In combination with the transmission gears and the clutch of a motor vehicle, a slidable shifter shaft, a shift arm secured on said shaft for engaging the notches in the gear shifting forks, a slotted rock link, a connecting rod having one end slidably fitted in the slot of said slotted rock link, a bell crank having one arm connected to the other end of said connecting rod, means connecting the other arm of said bell crank to the clutch pedal, a cam arm turnably mounted on said shifter shaft and formed with a cam tooth, a stationary part formed with a cam notch to receive said cam tooth, a spring coiled around said shifter shaft between said rock link and said cam arm for urging said cam tooth into said cam notch and the shifter shaft in one direction, another spring on said shifter shaft for urging the shifter shaft in the other direction, a shift setting rod extending through the steering post of the motor vehicle, a rod connecting said cam arm and the lower end of said shift setting rod, a shift setting arm on the upper end of said shift setting rod for turning said cam arm through said shift setting rod and said connecting rod, for causing the cam tooth to engage said cam notch and said shift arm to engage both notches in the gear shifting forks for neutral position, or said shift arm to engage the notch in one fork for shifting the gears into low or reverse or said shift arm to engage the notch in the other gear shifting fork for shifting the gears into second or high.

3. In combination with the transmission gears and the clutch of a motor vehicle, shift actuating means actuated by the clutch pedal and shift setting means for setting said shift actuating means to shift said gears into low or reverse or into second or high upon depression of the clutch pedal a cover provided with five openings, a plate under said cover having thereon the letters N, L, R. S and H, and means for shifting said plate under said cover when the gears are shifted so that one of said letters will always be exposed through one of said openings to indicate the position in which the gears are shifted.

4. In combination with the transmission gears and the clutch of a motor vehicle, a slidable shifter shaft, a shift arm secured on said shaft for engaging the notches in the gear shifting forks, a slotted rock link, a connecting rod having one end slidably fitted in the slot of said slotted rock link, a bell crank having one arm connected to the other end of said connecting rod, means connecting the other arm of said bell crank to the clutch pedal, and shift setting means for shifting and setting said shifter shaft for causing said shift arm to engage both notches in the gear shifting forks for neutral position, or to engage the notch in one fork for shifting the gears into low or reverse, or to engage the notch in the other shifting fork for shifting the gears into second or high; an indicator arm on said shifter shaft, a plate on the end of said indicator arm on which plate are the letters N, L, R, S and H, a cover over said plate provided with five openings, through one of which openings one of said letters is always exposed to indicate the position in which the gears are shifted.

WALTER GNEHM.